United States Patent
Kreiner et al.

(10) Patent No.: US 6,823,372 B1
(45) Date of Patent: Nov. 23, 2004

(54) SYSTEM AND METHOD FOR REVERSE PROXY SERVICE

(75) Inventors: Barrett M. Kreiner, Norcross, GA (US); Donna K. Hodges, Cumming, GA (US); Jonathan M. Peterson, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 236 days.

(21) Appl. No.: 10/243,114

(22) Filed: Sep. 13, 2002

(51) Int. Cl.[7] .............................................. G06F 13/14
(52) U.S. Cl. ........................................ 709/218; 711/118
(58) Field of Search ................................ 709/217, 218; 711/118, 129

(56) References Cited

U.S. PATENT DOCUMENTS 6,021,426 A * 2/2000 Douglis et al. ............. 709/200
6,219,676 B1 * 4/2001 Reiner ....................... 707/201

* cited by examiner

Primary Examiner—Kevin L. Ellis
(74) Attorney, Agent, or Firm—Woodcock Washburn LLP

(57) ABSTRACT

Data items that are retrieved in response to a data request are compared to previously retrieved copies of the same data items. Portions of a data item that have not changed relative to the previous version may be specially designated as a virtual-edge-side-asset. The data items are modified to replace portions corresponding to VESA's with references to those VESA's. The modified version of the data item is communicated across the network. At a computing system closer in network proximity to the requesting machine, the data item is again modified to replace references to VESA's with the actual portion of the data item that was removed.

28 Claims, 4 Drawing Sheets

SYSTEM AND METHOD FOR REVERSE PROXY SERVICE

FIELD OF THE INVENTION

The present invention relates generally to computing systems, and more particularly, to systems and methods for network data distribution.

BACKGROUND

Significant effort has been devoted to optimizing the operation of large networks such as, for example, wide area networks (WAN's), the Internet, and the World-Wide-Web ("the Web"). To date, however, those efforts have largely been directed at improving the operation of networks from the perspective of consumers of data. For example, in a network such as the Web, when a Web browser issues a request for a Web page, without network optimization it may be necessary to traverse a large portion of the network in order to reach the one Web server on which the requested page exists. Of course, traversing a large portion of the Web can take a relatively long time. One technique for addressing this limitation has been to distribute the same data items on many servers throughout the network. When a request for a distributed data item is made, it is likely that the data item can be accessed quickly without traversing a large portion of the Web.

Efforts to improve network performance for consumers of data have been very effective. Indeed, the high quality of service provided by modern networks has resulted in a significant increase in network usage. Not surprisingly, increased network usage has resulted in higher levels of network traffic. The resulting increase in network traffic has been so great, in fact, that there now exists a need for means to conserve network resources while continuing to provide the same high level of performance.

SUMMARY

Illustrative systems and methods for distributing data while conserving network resources are disclosed herein. In an illustrative embodiment, a first computing system, which may comprise, for example, a digital subscriber line multiplexor (DSLAM) and a proxy server, is communicatively coupled using a digital subscriber line (DSL) to a second computing system, which may comprise a data server. Requests for data such as, for example, a Web page, that are directed to the data server are received first at the proxy server, which forwards the requests to the data server.

The proxy server receives a response from the data server including data items such as, for example, Web pages and data files corresponding to items displayed on the Web pages.

For each data item received, the proxy server determines whether the same data item has previously been received. For example, the proxy server determines whether a Web page with the same file name was previously received. If not, the proxy server stores the data item locally.

If the proxy server determines that a requested data item was previously received at the proxy server from the data server, the proxy server compares the data item to the previously received version of the data item. For example, the proxy server may compare a Web page with a previously stored copy of the Web page with the same name. In comparing the data items, the proxy server determines whether all or portions of the data item have changed. Those portions of the data item that have not changed may be specially identified as virtual-edge-side-assets (VESA). For example, a text portion of a Web page may not have changed and might therefore be a candidate for designation as a VESA. File components designated as VESA's are saved as separate files and distributed to other proxy servers in the network. The VESA's are used to reconstruct the data items prior to delivery to the requesting party.

When comparing a data item to a previously stored version of the data item, the proxy server may also determine whether a portion of the data item that was previously designated as a VESA has changed and therefore should no longer be designated as such. In these instances, the proxy server communicates to other proxy servers on which the VESA may have been stored that the particular VESA is no longer valid.

Where a VESA has been identified, the portion of a data item that corresponds to the VESA is removed from the data item and replaced by a reference to the VESA. For example, a text portion of a Web page that is identified as static and therefore designated as a VESA may be removed and replaced with an HTML "include" command directed to the particular VESA. Replacing the data content with a reference to the VESA has the effect of reducing the size of the data item file. The reduced data items are communicated across the network to a proxy server located in proximity to the machine from which the data request originated. Reducing the size of a data item file prior to transmission over the network reduces the bandwidth needed to transmit the file and thereby conserves network resources. Upon receipt of the data item, the second proxy server reconstructs the data item by inserting the body of the VESA's as appropriate.

BRIEF DESCRIPTION OF THE DRAWINGS

Other features of systems and methods for distributing data are further apparent from the following detailed description of presently preferred exemplary embodiments taken in conjunction with the accompanying drawings, of which.

DETAILED DESCRIPTION OF THE INVENTION

Exemplary systems and methods for distributing data content are described below with reference to FIGS. 1–4. It will be appreciated by those of ordinary skill in the art that the description given herein with respect to those figures is for exemplary purposes only and is not intended in any way to limit the scope of the invention.

In an illustrative data distribution system, data items that are retrieved in response to a data request, are compared to previously retrieved copies of the same data items. Portions of a data item that have not changed relative to the previous version may be specially designated as a VESA. The data items are modified to replace portions corresponding to VESA's with references to those VESA's. The modified version of the data item is communicated across the network. At a computing system closer in network proximity to the requesting machine, the data item is again modified to replace references to VESA's with the actual portion of the data item that was removed.

Figure 1:
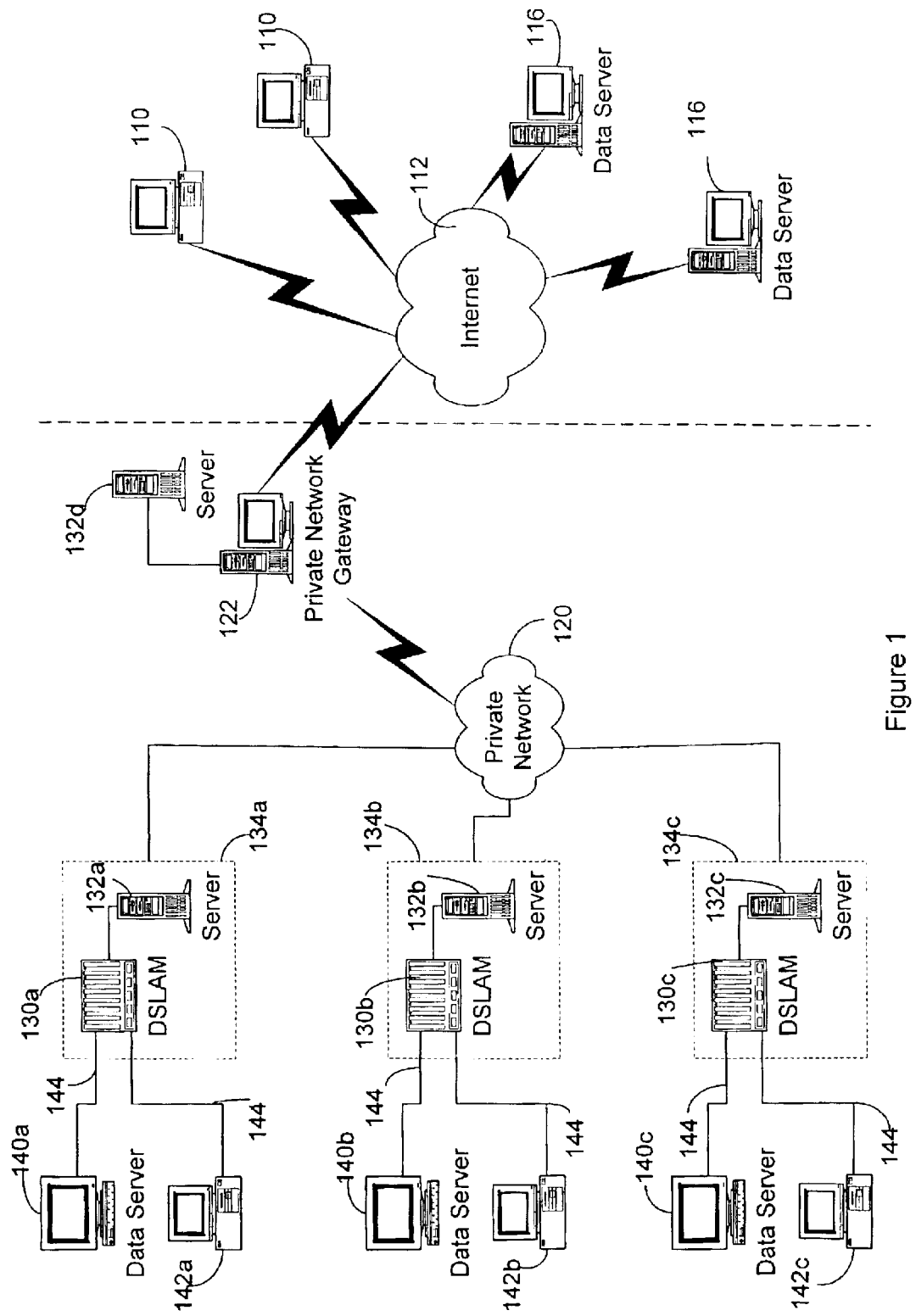
FIG. 1 is a high level diagram of an exemplary network system in which data content is distributed.

FIG. 1 provides a high level diagram of an illustrative network system for distributing data content. As shown, computing systems 110, which may be, for example, personal computers, are operably coupled to Internet 112 and may be used to access data content stored at data servers 116. In an illustrative embodiment, computing systems 110 may have Web browsing software such as, for example, Netscape Navigator, operating thereon and data servers 116 may have Web server software such as, for example, Apache Web Server, operating thereon. Accordingly, in an illustrative embodiment, computing systems 110 may access Web pages stored on data servers 116. Data items such as Web pages may be distributed into Internet 112 and stored on multiple data servers 116 positioned close to computing systems 110 so as to reduce access times.

Data might also be distributed via private network 120, which is communicatively coupled to is Internet 112 via gateway 122. Private network 120 may be a network operated by an organization such as, for example, an Internet service provider (ISP). Further, private network 120 may be, for example, a network operated by a telephone service provider that also provides data services. In an illustrative embodiment, private network 120 is communicatively coupled to a plurality of multiplexing devices 130a, 130b, and 130c, which may be, for example, digital subscriber line access multiplexors (DSLAM's). Multiplexing devices 130a–c are communicatively coupled to proxy servers 132a, 132b, and 132c, which operate as described below to store, and distribute data items. Multiplexing devices 130a–c and proxy servers 132a–c may be co-located at central office (CO) locations 134. Proxy server 132d is communicatively coupled to gateway 122 to provide a data distribution point close to Internet 112. As shown, proxy servers 132a–d are located at the network edge and are therefore close to data content providers as well as consumers of that content.

Small office/home office (SOHO) data servers 140a–c and SOHO computing systems 142a–c are communicatively coupled to DSLAM's 130a–c via digital subscriber lines (DSL) 144. SOHO data servers 144a–c have data stored thereon that may be accessed from data access computing systems 142a–c and 110. In an illustrative embodiment, SOHO data servers 144a–c have Web server software running thereon for serving Web page data, and computing systems 142a–c have Web browser software thereon for viewing Web page data.

SOHO data servers 140a–c may be used to distribute a wide variety of data. Often, SOHO data servers 140a–c are employed to provide business-related data to potential clients and to facilitate business transactions. For example, many small businesses sell products over the Web and devote their data servers 140a–c to performing the transactions.

Figure 2:
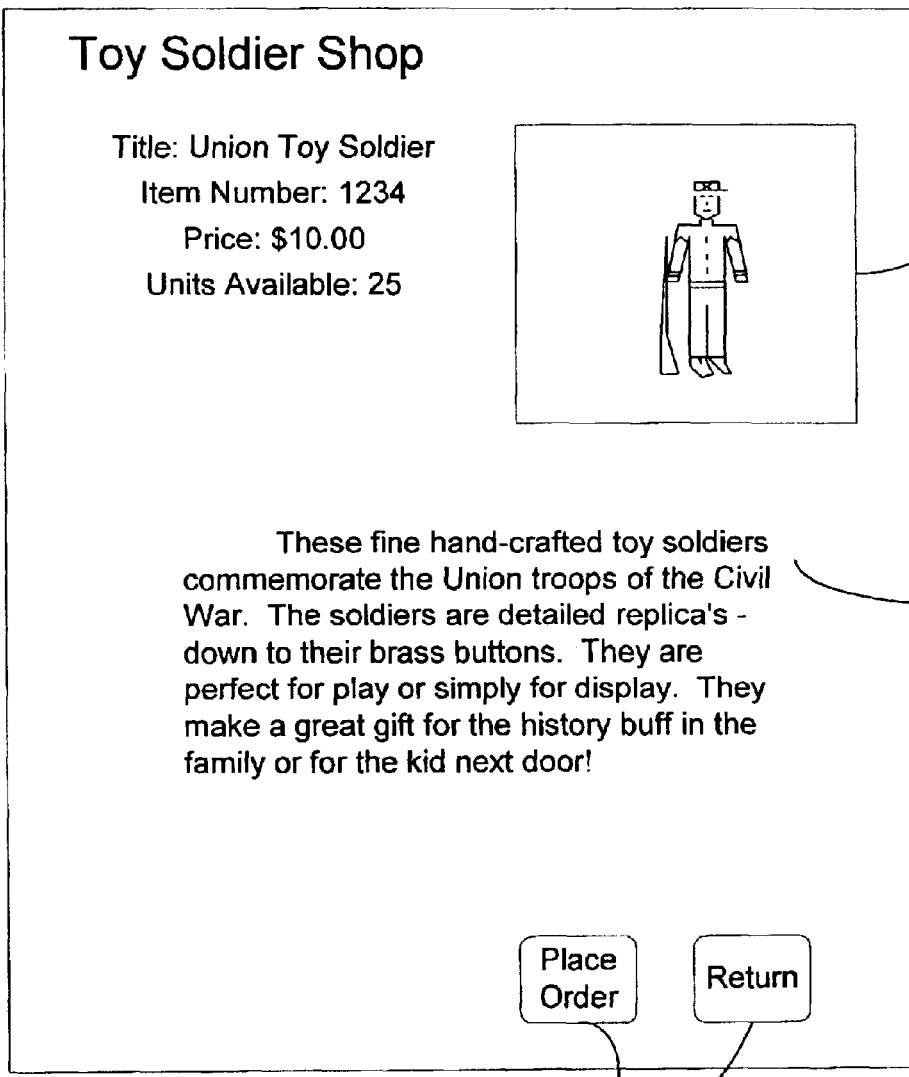
FIG. 2 is an exemplary Web page comprising data content that may be distributed using systems and methods according to those disclosed herein.

FIG. 2 depicts an exemplary Web page 210 that may be stored on one of SOHO data servers 140a–c and retrieved by computing systems 142a–c or 110. Exemplary web page 210 provides product information regarding toy soldiers that are being offered for sale, perhaps as part of a Web site devoted to selling toys. As shown, Web page 210 comprises graphic 220 depicting a toy soldier, text description 222, which describes the particular toy soldier model, and buttons 224 for navigating to an order page or returning to a selection listing. Portions of Web page 210 such as graphic 220, text 222, and buttons 224 are unlikely to change over time. Accordingly, these items are candidates for being designated as VESA'S. The VESA's are stored separate from the file of which they are a part, and cached at proxy servers throughout the network. A data item file may be modified to replace the portions corresponding to any VESA's with references to those VESA's. For example, an HTML file corresponding to Web page 210 may be modified to comprise HTML "include" commands indicating that particular VESA's are to be inserted at the appropriate location when Web page 210 is displayed.

Figure 3:
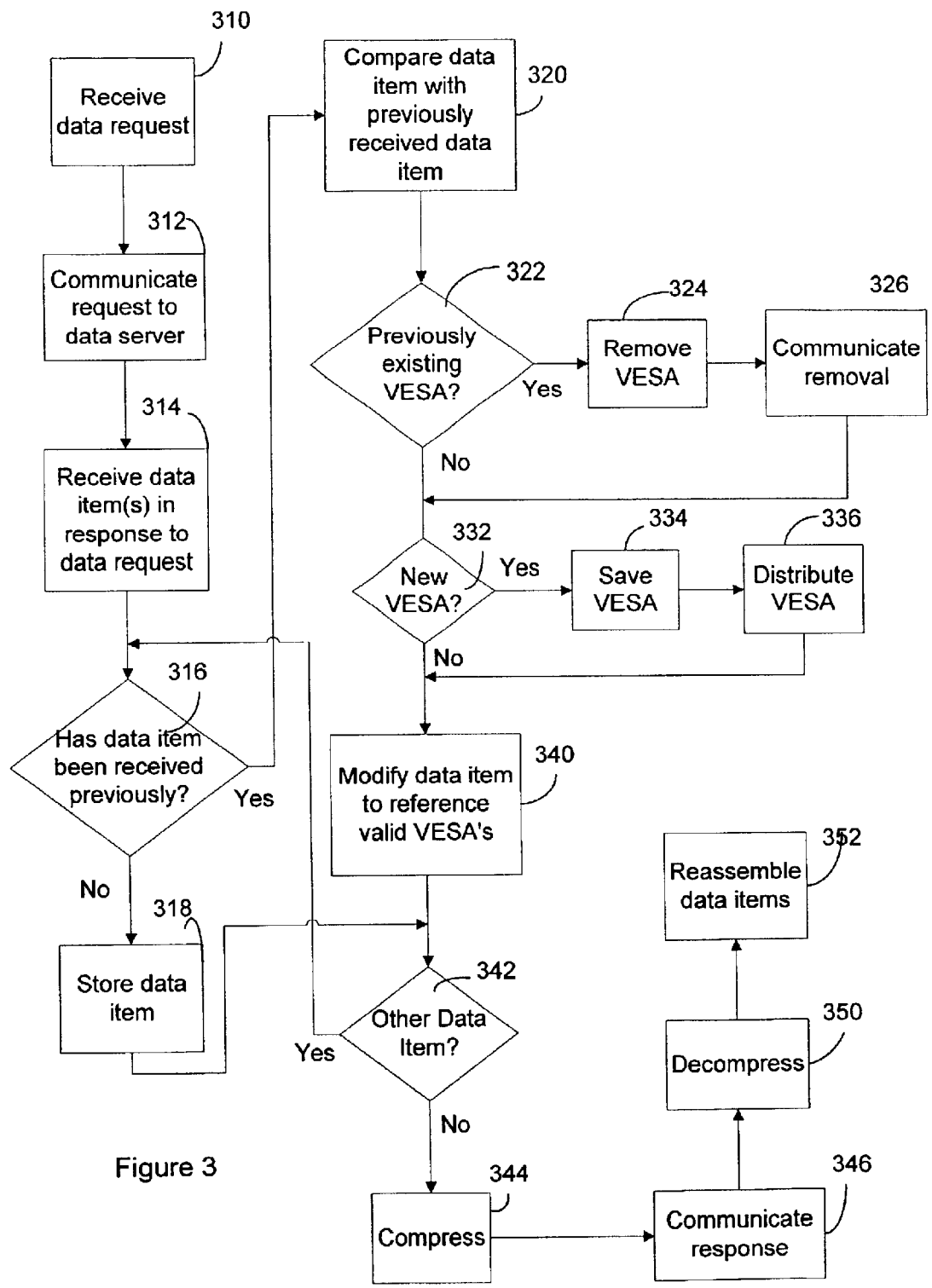
FIG. 3 is a flow chart of an exemplary method for distributing data content.

FIG. 3 is a flow chart depicting an illustrative method for distributing data items while conserving network resources. As shown, at step 310, a data request is received at a first computing system, wherein the data request is directed to a second computing system communicatively coupled to the first computing system. For example, a request for a Web page originally directed to data server 140a, may be routed by DSLAM 130a to proxy server 132a. At step 312, proxy server 132a communicates the data request to data server 140a.

At step 314, a response to the data request is received from data server 140a at proxy server 132a. The response may comprise a plurality of data items. For example, the response may comprise a file for displaying a Web page as well as files corresponding to items such as graphics and text that are displayed on the particular Web page. Specifically, the response may comprise an HTML file for generating Web page 210.

At step 316, it is determined for each data item in the response whether the item was previously received from the data server. For example, if an HTML file corresponding to Web page 210 is received, it is determined whether that particular file was previously received at proxy server 132a from data server 140a. If a data item has not previously been received at the proxy server, at step 318 the data item is stored in memory at the proxy server.

If at step 316 it is determined that the data item was previously received, at step 320 the data item is compared to the copy of that particular data item that was previously received. For example, the HTML file corresponding to Web page 210 may be compared to a previously retrieved version of the same file.

At step 322, it is determined whether the VESA's previously identified for the particular data item still exist. In other words, it is determined whether the portions that were previously identified as VESA's have changed. For example, if text 222 of Web page 210 was previously designated as a VESA, but in the recently received copy of Web page 210 text 222 has changed, text 222 of Web page 210 should no longer be designated as a VESA. Accordingly, at step 324, the change in status of the VESA is noted in memory and at step 326 the change in status is communicated to other proxy servers in the network. For example, the memory of proxy server 132a is updated to remove the VESA, and instructions for doing the same at proxy servers 132b–d are communicated to those proxy servers.

At step 332, new VESA's are identified. For example, if Web page 210 has been received at proxy server 132a from data server 140a for the second time, and text 222 and buttons 224 have not changed, these items may be designated as VESA's. At step 334 any new VESA designations are stored locally, and at step 336 are communicated to other proxy servers in the network.

At step 340, the particular data item being compared is modified to reference any changes in VESA identity. For example, if text 222 of Web page 210 is identified as a VESA, at step 340 the HTML file corresponding to page 210 is modified to remove the text and replace it with an HTML "include" statement referencing the newly created VESA.

At step 342 it is determined whether any other data items have been received in response to the data request. If so, processing begins again at step 316. However, if no further data items exist, processing continues at step 344 where the data items are compressed to conserve network resources. At step 346, the data items are communicated over network 120 to one of proxy servers 132b–d that is closest to the computing machine 142b–c, or 110 from which the initial request was made.

At step 350, the proxy server at which the data item(s) are received decompresses the data item(s). At step 352, the data items are reassembled. Specifically, any references to VESA's in the data items are replaced by the appropriate VESA content. For example, an HTML file corresponding to Web page 210 that had a VESA reference to a VESA comprising text 222, is edited to replace the VESA reference with the actual text 222.

Figure 4:
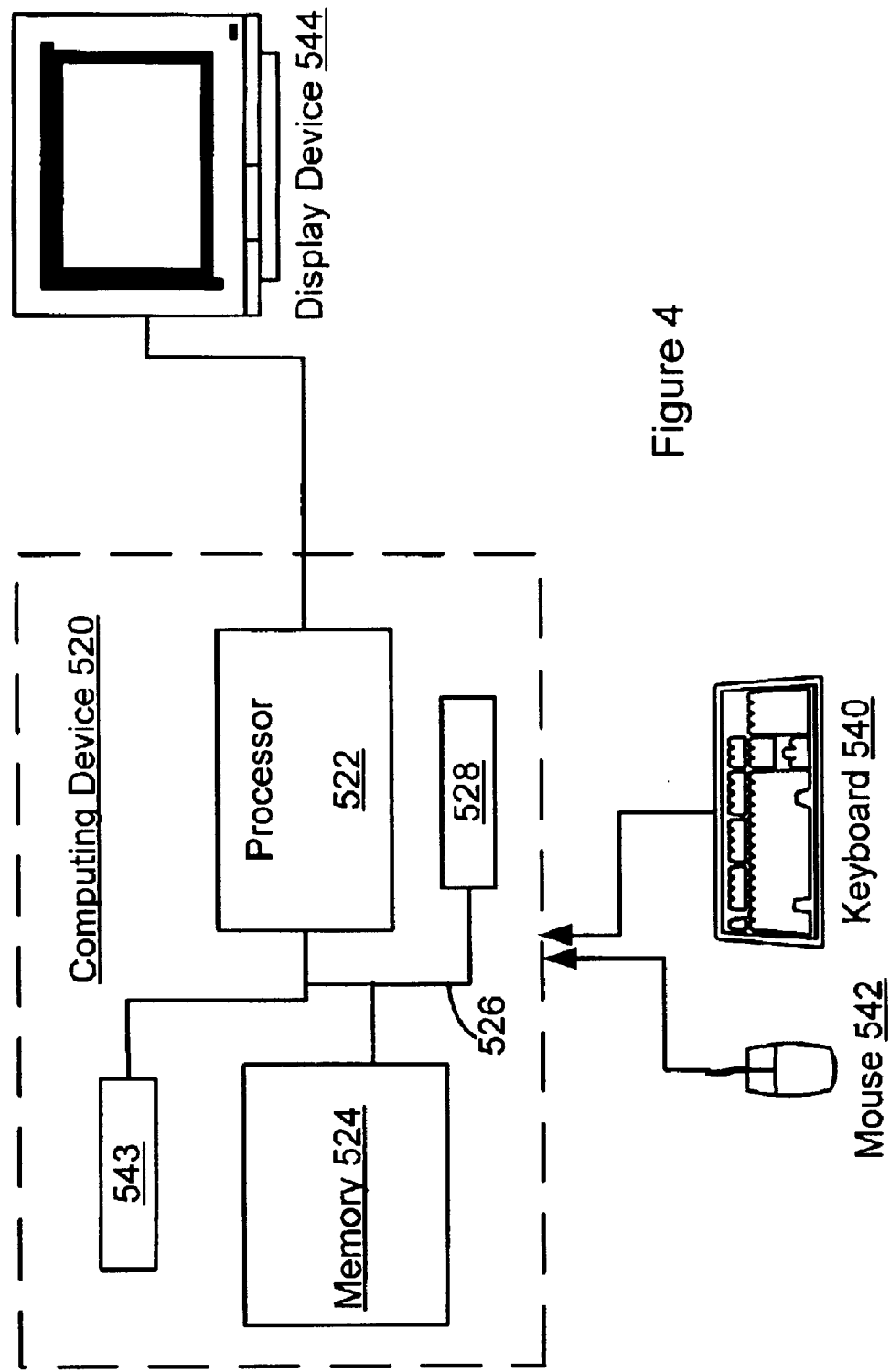
FIG. 4 is a diagram of a computing device operable for use in performing the disclosed method.

FIG. 4 is a diagram of a generic computing device, which may be operable to be used in the above-described network. For example, the generic computing device may be employed as proxy servers 132, data servers 140 and 116, or computing systems 132 and 110. As shown in FIG. 4, computing device 520 includes processor 522, system memory 524, and system bus 526 that couples various system components including system memory 524 to processor 522. System memory 524 may include read-only memory (ROM) and/or random access memory (RAM). Computing device 520 may further include hard-drive 528, which provides storage for computer readable instructions, data structures, program modules, data, and the like. A user (not shown) may enter commands and information into the computing device 520 through input devices such as keyboard 540 or mouse 542. A display device 544, such as a monitor, a flat panel display, or the like is also connected to computing device 520. Communications device 543, which may be a modem, network interface card, or the like, provides for communications over a network. System memory 524 and/or hard-drive 528 may be loaded with any one of several computer operating systems such as WINDOWS NT operating system, WINDOWS 2000 operating system, LINUX operating system, and the like.

Those skilled in the art understand that computer readable instructions for implementing the above-described processes, such as those described with reference to FIG. 3, can be generated and stored on one of a plurality of computer readable media such as a magnetic disk or CD-ROM. Further, a computer such as that described with reference to FIG. 4 may be arranged with other similarly equipped computers in a network, and each computer may be loaded with computer readable instructions for performing the above-described processes. Specifically, referring to FIG. 4, processor 522 may be programmed to operate in accordance with the above-described processes.

Thus, systems and methods for distributing data while conserving network resources have been disclosed. In an illustrative embodiment, static portions of data items are removed and replaced with references to those static portions. The reduced data items are communicated over the network and at a location in proximity to the requesting party are reassembled to incorporate the actual substance of the static portions. Reducing the data items prior to transmission operates to conserve network bandwidth.

While systems and methods have been described and illustrated with reference to specific embodiments, those skilled in the art will recognize that modification and variations may be made without departing from the principles described above and set forth in the following claims. For example, while the system has been described as comprising proxy servers 132a–d, much of the functionality described as being provided by proxy servers 132a–d may be incorporated into DSLAM's 130a–c. Furthermore, while the exemplary data items described herein are Web pages, other types of data may similarly be distributed using the illustrative methods and systems. Furthermore, while the exemplary VESA's described above comprised text, graphics, and buttons, other items may likewise be defined as VESA's. Accordingly, reference should be made to the following claims as defining the scope of the invention.

What is claimed is:

1. A method for distributing data items, comprising:
    receiving at a first computing system a request for a data item;
    communicating the request to a second computing system;
    receiving at least one data item from the second computing system;
    determining whether the at least one data item has previously been received; and
    if the at least one data item has previously been received, comparing the at least one data item to a previously received data item, and
    if the at least one data item comprises a portion that is the same as a portion in the previously received data item, identifying the portion and replacing the portion with a reference to the portion, and communicating the modified data item to a third computing system.

2. The method of claim 1, wherein receiving at a first computing system a request for a data item comprises receiving a request for a Web page.

3. The method of claim 1, wherein communicating the request to a second computing system comprises communicating a request for a Web page to a second computing system.

4. The method of claim 1, wherein receiving at least one data item from the second computing system comprises receiving a Web page.

5. The method of claim 4, wherein receiving a Web page comprises receiving a file comprising instructions for displaying a Web page.

6. The method of claim 1, wherein determining whether the at least one data item has previously been received comprises determining whether a file with the same name has previously been received.

7. The method of claim 6, wherein determining whether a file with the same name has previously been received comprises searching memory for a file with the same title.

8. The method of claim 1, wherein comparing the at least one data item to a previously received data item comprises determining if portions of the at least one data item are the same as portions of the previously received data item.

9. The method of claim 1, further comprising saving the portion in memory and communicating the portion to at least the third computing system.

10. The method of claim 9, wherein communicating the portion to at least the third computing system comprises communicating the portion to a plurality of computing systems.

11. The method of claim 1, wherein comparing the at least one data item to a previously received data item comprises determining if portions of the at least one data item that were previously identified as being the same have changed.

12. The method of claim 11, further comprising removing from memory portions of the at least one data item from memory.

13. The method of claim 11, further comprising communicating to other computing systems that portions of the at least one data item that were previously identified as being the same have changed.

14. The method of claim 1, wherein modifying the data item to replace the portion with a reference to the portion comprises modifying an HTML file to include a reference to the portion.

15. The method of claim 14, wherein modifying an HTML file to include a reference to the at least one data item comprises modifying an HTML file to include a reference to an edge side asset.

16. The method of claim 15, wherein said edge side asset is a virtual edge side asset.

17. The method of claim 1, further comprising compressing the modified data item.

18. The method of claim 1, further comprising receiving the modified data item at the third computing system and replacing the reference to the portion with the portion.

19. The method of claim 1, wherein said first computing system comprises a server computer, said second computing system comprises a server computer, and said third computing system comprises a server computer.

20. The method of claim 1, wherein said first computing system comprises a machine for multiplexing communication lines.

21. The method of claim 20, wherein said first computing system comprises a DSLAM.

22. The method of claim 1, wherein said at least third computing system comprises a machine for multiplexing communication lines.

23. The method of claim 1, wherein said first computing system comprises a first Web server, said second computing system comprises a second Web server, and said third computing system comprises a Web server.

24. A method for distributing data items, comprising:

receiving at a first computing system a request for a Web page;

communicating the request to a second computing system;

receiving a Web page from the second computing system;

determining whether the Web page has previously been received; and if the Web page has previously been received, comparing the Web page to a previously is received Web page, and if the Web page comprises a portion that is the same as a portion in the previously received Web page, identifying the portion and replacing the portion with a reference to the portion, and communicating the modified Web page to a third computing system.

25. The method of claim 24, wherein identifying the portion comprises identifying the portion as a virtual edge side asset.

26. The method of claim 24, wherein replacing the portion with a reference to the portion comprises modifying the Web page to remove the portion and inserting therefore a reference to the virtual edge side asset.

27. A system for distributing data, comprising:

a processor; and instructions executable on said process, said instructions for performing the following steps:

receiving at a first computing system a request for a Web page;

communicating the request to a second computing system;

receiving a Web page from the second computing system;

determining whether the Web page has previously been received; and if the Web page has previously been received, comparing the Web page to a previously received Web page, and if the Web page comprises a portion that is the same as a portion in the previously received Web page, identifying the portion and replacing the portion with a reference to the portion, and communicating the modified Web page to a third computing system.

28. A method for data distribution, comprising:

caching data items at a proxy server as they are received from a data server;

upon receiving a new data item from the data server, determining whether a previously received copy of the new data item is stored in cache;

if a previously received copy of the new data item is stored in cache, comparing the new data item with the previously received copy, identifying portions of the new data item that are the same as portions of the previously received copy, replacing the portions with references to the portions, and communicating the modified new data item to a third computing system.

* * * * *

UNITED STATES PATENT AND TRADEMARK OFFICE
CERTIFICATE OF CORRECTION

PATENT NO. : 6,823,372 B1
DATED : November 23, 2004
INVENTOR(S) : Barrett M. Kreiner et al.

It is certified that error appears in the above-identified patent and that said Letters Patent is hereby corrected as shown below:

Column 8,
Line 1, delete the word "is"

Signed and Sealed this

Eighth Day of March, 2005

JON W. DUDAS
*Director of the United States Patent and Trademark Office*